(No Model.)

K. RASMUSSEN.
DRIVING DOG FOR TURNING LATHES.

No. 353,815. Patented Dec. 7, 1886.

Witnesses:
Sallie C. Steire
Rufus Bennett Fowler

Inventor:
Knud Rasmussen

UNITED STATES PATENT OFFICE.

KNUD RASMUSSEN, OF WORCESTER, MASSACHUSETTS, ASSIGNOR TO THE POND MACHINE TOOL COMPANY, OF SAME PLACE.

DRIVING-DOG FOR TURNING-LATHES.

SPECIFICATION forming part of Letters Patent No. 353,815, dated December 7, 1886.

Application filed December 14, 1885. Serial No. 185,577. (No model.)

*To all whom it may concern:*

Be it known that I, KNUD RASMUSSEN, a citizen of the United States, residing at Worcester, in the county of Worcester and State of Massachusetts, have invented certain new and useful Improvements in Driving-Dogs for Turning-Lathes, of which the following is a specification, reference being had to the accompanying drawings, representing my improved dog in detail, and also illustrating its use in a turning-lathe.

My invention consists, first, in a bar pivoted at or near one end in lugs attached to the face-plate of the lathe, and when in use forming an angle with the face-plate; second, in an extensile bar pivoted in lugs, whereby its length may be required by the work to be driven; third, in bracing said pivoted bar against the face-plate, so its angle with the face-plate shall be maintained; and, fourth, in the several details of construction and operation, as hereinafter described, and specifically set forth in the claims.

Figure 1:
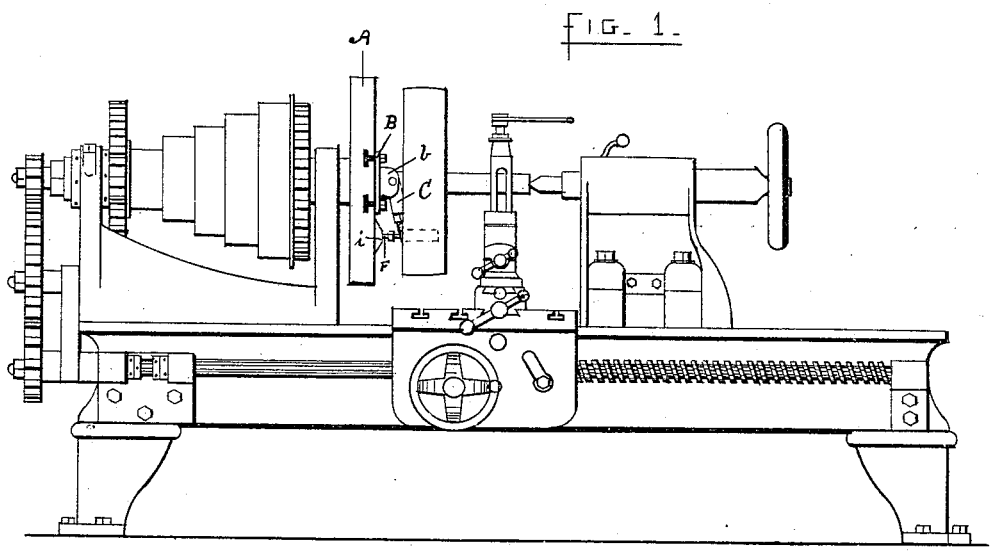
Figure 2:
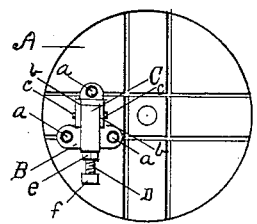
Figure 3:
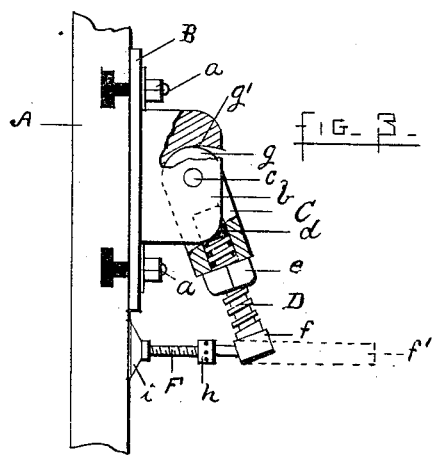

Figure 1 is a front elevation of a turning-lathe, showing my improved dog in use. Fig. 2 shows the front of the face-plate with the dog attached. Fig. 3 is an enlarged view of the dog, shown partly in section.

Similar letters refer to similar parts in the several views.

A is the face-plate; B, a plate attached by bolts $a$ to the face-plate, and having lugs $b$, in which are journaled the gudgeons $c$ of the bar C.

In the free end of the bar C is a hole, $d$, in which I place a screw-threaded extension, D, having a check-nut, $e$, and head $f$, which is made to engage any indentation or projecting portion of the surface of the work to be turned, by which the rotating face-plate is made to rotate the work through the longitudinal thrust or pressure of the bar C, which is received at its end $g$ against a curved socket, $g'$, thereby relieving the gudgeons from the strain incident to driving the work.

The head $f$ may be extended laterally, as shown by the broken lines $f'$, to more readily enter holes in the work, or to be carried beneath and support the rim of pulleys while they are being turned; or other forms may be given to the head $f$, to enable it to accommodate itself to the peculiar conformation of the work to be rotated.

I usually employ a brace between the face-plate A and head $f$, which I make, preferably, in the form of a jack-screw, F, held in a base, $i$, which rests and is movable upon the surface of the face-plate. The screw is rotated by means of the head $h$, to secure the desired angle between the bar C and the face-plate and hold the head $f$ against the work; but I do not confine myself to the use of a jack-screw, as described, as it is evident that many other methods of maintaining the bar C in position might be employed and yet come within the scope of my invention.

I am aware that driving devices have been used consisting of a pair of parallel jaws sliding in ways on the face-plate of the lathe, and having an adjusting-screw by which their distance apart may be varied; also, that a pair of parallel jaws have been used sliding on a bar attached to the face-plate, said jaws being adjustable with reference to each other and also to the face-plate. Such I do not claim; but

What I claim as my invention, and desire to secure by Letters Patent, is—

1. A driving-dog for turning-lathes, consisting of a bar pivoted at one end in bearings carried by the face-plate of the lathe, said bar forming a variable angle with the face plate, and with its free end adapted to rest against the work, so a rotary motion may be conveyed to the work by an end-thrust of the bar, substantially as described.

2. A driving-dog for turning-lathes, consisting of a bar pivoted in bearings carried by the face-plate of the lathe, the free end of said bar having an extensible section, whereby the length of the bar may be varied, as described, and for the purpose set forth.

3. The combination, with the face-plate of a lathe having a concave socket, of a driving-bar having a convex end held in said socket, so it may form a variable angle with the face-plate, substantially as described.

4. A driving-dog for turning-lathes, consisting of a bar pivoted in bearings carried by the face-plate, the free end of said bar having a longitudinal hole carrying a screw-threaded bolt capable of sliding in said hole, said bolt having a check-nut resting against the free end of the said pivoted bar, as described, and for the purpose set forth.

5. The combination, with a driving-dog for turning-lathes, consisting of a bar pivoted in bearings carried by the face-plate of the lathe, with its free end resting against the work, of a brace between said free end and the face-plate, for holding the dog against the work, as described, and for the purpose set forth.

KNUD RASMUSSEN.

Witnesses:
RUFUS B. FOWLER,
C. F. STEVENS.